United States Patent [19]

Tanaka et al.

[11] Patent Number: 4,993,780
[45] Date of Patent: Feb. 19, 1991

[54] REGENERATIVE BRAKING SYSTEM FOR CAR

[75] Inventors: Koji Tanaka; Takashi Shima, both of Tokyo, Japan

[73] Assignee: Isuzu Motors Limited, Tokyo, Japan

[21] Appl. No.: 424,552

[22] Filed: Oct. 20, 1989

[30] Foreign Application Priority Data

Oct. 24, 1988 [JP] Japan .................... 63-267966

[51] Int. Cl.⁵ .................... B60T 13/74; B60T 1/10
[52] U.S. Cl. .................... 303/3; 180/165; 188/159; 303/20; 303/100
[58] Field of Search .............. 303/3, 20, 100, 101; 180/53.7, 53.4, 54.1, 165, 302; 188/156, 159, 195; 192/3.56, 3.58, 12 D, 18 B, 40; 318/370, 376, 382; 364/426.1, 426.5; 417/217, 223

[56] References Cited

U.S. PATENT DOCUMENTS

| | | | |
|---|---|---|---|
| 3,890,551 | 6/1975 | Plunkett | 318/376 |
| 4,246,988 | 1/1981 | Hoppie | 180/54.1 |
| 4,432,703 | 2/1984 | Beutel et al. | 417/217 |
| 4,453,113 | 6/1984 | Merlino et al. | 318/376 |
| 4,589,293 | 5/1986 | Mori | 180/53.4 |
| 4,741,410 | 5/1988 | Tunmore | 180/165 |
| 4,908,553 | 3/1990 | Hoppie et al. | 318/370 |

FOREIGN PATENT DOCUMENTS

| | | |
|---|---|---|
| 61-175150 | 8/1986 | Japan . |
| 61-175151 | 8/1986 | Japan . |
| 61-175152 | 8/1986 | Japan . |
| 61-175153 | 8/1986 | Japan . |
| 61-175154 | 8/1986 | Japan . |
| 62-15128 | 1/1987 | Japan . |
| 62-18324 | 1/1987 | Japan . |
| 62-18325 | 1/1987 | Japan . |
| 62-18326 | 1/1987 | Japan . |
| 62-18327 | 1/1987 | Japan . |
| 62-31522 | 2/1987 | Japan . |
| 62-31523 | 2/1987 | Japan . |
| 62-34819 | 2/1987 | Japan . |
| 62-37215 | 2/1987 | Japan . |
| 62-37216 | 2/1987 | Japan . |
| 62-37217 | 2/1987 | Japan . |
| 62-37218 | 2/1987 | Japan . |
| 62-39325 | 2/1987 | Japan . |
| 62-39326 | 2/1987 | Japan . |
| 62-39327 | 2/1987 | Japan . |

OTHER PUBLICATIONS

1979 Society of Automotive Engineers, Inc., "Improvement of Citybus Fuel Economy Using a Hydraulic Hybrid Propulsion System—A Theoretical and Experimental Study", by P. Buchwald et al., pp. 1–15.

1985 Society of Automotive Engineers, Inc., "Predicting the Retardation Performance of Vehicles Equipped with Hydro-Pneumatic Energy Storage System", by Anthony S. Davies et al., pp. 2.516–2.523.

1985 Society of Automotive Engineers, Inc., "Studies of an Accumulator Energy-Storage Automobile Design with a Single Pump/Motor Unit", by S. Tollefson et al., pp. 1–9.

1985 Society of Automotive Engineers, Inc., "Fuel Economy and Operating Characteristics of a Hydropneumatic Energy Storage Automobile", Peirong Wu et al., pp. 1–10.

(List continued on next page.)

Primary Examiner—Douglas C. Butler
Attorney, Agent, or Firm—Staas & Halsey

[57] ABSTRACT

A regenerative braking system for a car in which when a hydraulic circuit is not operated, effective maximum displacement controlling current and minimum displacement controlling current for a pump/motor in the hydraulic circuit are studied on the basis of a variation of the sensed displacement angle when the maximum permissible current and the minimum operating current previously given to a displacement angle controlling electromagnetic proportional control valve are respectively decreased and increased stepwise. A displacement controlling current per a unit capacity for the control valve is determined.

8 Claims, 7 Drawing Sheets

OTHER PUBLICATIONS

Automotive Engineering, vol. 92, No. 10, Oct. 1984, *International Viewpoints*, "Regenerative Braking for Buses Gives Big Fuel Saving", by David Scott and Jack Yamaguchi, pp. 95–99.

Commercial Motor, Jan. 24, 1987, *Brakes Developments*, "Braking New Ground", pp. 35–36.

"Cumulo Bus for London", Dec. 1985, p. 537.

Automotive Engineering, vol. 87, No. 10, Oct. 1979, *International Viewpoints*, "Regenerative Braking Cuts Bus Fuel Needs", by David Scott, pp. 102–107.

ATZ Automobiltecnische Zeitschrift 80 (1978) 12, "Hydro-Bus-Ein Stadtlinienbus mit Hydrostatischer Bremsenergieruckgewinnung", by Thomas Thier et al., pp. 597–600.

ATZ Automobiltechnische Zeitschrift 81 (1979) 7/8, Antriebe zur "Bremsenergie-Ruckgewinnung bei Omnibussen", by Faust Hagin et al., pp. 327–330.

University of Queensland, May 1984, Department of Mechanical Engineering, (Drawing of Fig. 4) "Optimisation of a Regenerative Energy Storage System for a 10 Tonne Bus", by M. K. Vint.

University of Queensland, Aug. 1986, Department of Mechanical Engineering, "Overview of the Design and Installation of a Regenerative Braking, Storage and Propulsion System for a Leyland Panther Bus", by M. K. Vint, pp. (i)–5.

"Transmission of Engine/Flywheel Hybrid Vehicles" by Tsuneji Yada, vol. 37, No. 3, 1983, pp. 274–281.

"Regeneration Systems of Braking Energy", by Yuzuru Matsuura, vol. 32, No. 5, 1978, pp. 410–416.

REGENERATIVE BRAKING SYSTEM FOR CAR

BACKGROUND OF THE INVENTION

The present invention relates to a regenerative braking system for a car, and particularly to a regenerative braking system for a car wherein the decelerating energy of a car is captured and used for the starting/accelerating energy.

In a PTO (Power-take-off) output unit (system) or a deceleration energy recovery system as conventionally known, a part of the kinetic energy dissipated mainly as heat at a brake or engine during the deceleration of a car is captured in the form of hydraulic operating oil and accumulated in an accumulator. The accumulated energy is utilized for the starting energy and accelerating energy of the car.

For example, as the oldest one, in 1976 C. J. Lorence Corporation in England annouced the development of such a system using a bus of British Leyland Corporation. Since then, various research and developments has been conducted in Europe.

Recently, Japanese patent application Laid-open Nos. 62-15128, 62-37215, 62-39327, for example, have disclosed a deceleration energy recovery system which is essentially formed of a transmission (hereinafter referred to as T/M), a multi-stage gear-changed PTO unit, a PTO output shaft, a pump/motor, a hydraulic oil circuit, an electromagnetic clutch, an accumulator, and a control unit.

The T/M includes a counter shaft driven through an engine clutch, a main shaft connected to a wheel driving line, and a multi-staged gear train mechanism for transferring the rotation of the counter shaft to the main shaft through the gears. The multi-stage gear-changed PTO unit includes a counter shaft PTO gear disconnectably coupled to the counter shaft through a counter shaft PTO gear synchronizer, a main shaft PTO gear coupled to the counter shaft PTO gear and disconnectably coupled to the main shaft through a main shaft PTO gear synchronizer, and a PTO output shaft driven through driving gears coupled to the main shaft PTO gear. The pump/motor is coupled to the PTO output shaft, the hydraulic oil circuit consists of a high pressure oil line and a low pressure oil line and serves to connect the accumulator to an oil tank through the pump/motor, and the electromagnetic clutch serves to connect/disconnect the oil circuit to/from the PTO shaf.

The control unit controls the electromagnetic clutch and works the pump/motor as either a pump or a motor in response to the running condition of the car. Namely, for working the pump/motor as a pump, the torque of the wheels during the decelerating mode serves to accumulate the operating oil into the accumulator through the PTO unit thereby to capture the kinetic energy, i.e. braking energy mainly lost as heat in the brake or engine, and for working the pump/motor as a motor, the operating oil accumulated in the accumulator serves to generate starting/accelerating torque to drive the wheels through the PTO unit.

The control manner of this control unit is as follows:

① When the car start with inner pressure of the accumulator being sufficient, the pump/motor is controlled to serve as a variable capacity type motor, the capacity of which is controlled by varying the displacement angle (incline angle) of the swash plate or shaft in response to the accelerator pedal positions.

Since the pump/motor is also connected to the electromagnetic clutch, when the electromagnetic clutch is coupled to the PTO unit by the control unit, the pump/motor drives the car based on the hydraulic power accumulated in the oil circuit.

In the meantime, when the car speed exceeds a preset value corresponding to the gear position selected by a driver, the engine clutch is coupled to the engine for engine cruising. At the same time the PTO unit is gear-changed so as to turn off the counter shaft synchronizer which was on, and turn on the main shaft synchronizer which was off. The combined cruising of the pump/motor with the engine is carried out according to the hydraulic power based on the pedal position only if the accelerator pedal is largely operated by the foot.

② During the braking mode, the electromagnetic clutch is turned on, and the displacement angle control signal (pump capacity control signal) according to the brake pedal position is supplied to the pump/motor for the corresponding pumping operation while at the same time the engine is declutched.

Thus, the control unit controls the engine clutch to decouple the engine from the driving line of the wheels in order to capture a part of the braking energy which is to be consumed in the engine during the braking mode and to relieve the captured energy during the accelerating mode, while coupling the engine to the driving line in order to use the engine power solely or in combination with the motor during the starting/accelerating mode.

In such a prior art, the displacement capacity of the hydraulic operating oil, i.e. the incline angle of the pump/motor, is controlled according to the position of a brake pedal in the braking mode or the position of an accelerator pedal in the accelerating mode.

However, an electromagnetic proportional control valve for the displacement capacity (angle) of the pump/motor has electromagnetic hysteresis and electrical noise margin. If the capacity of the pump/motor is assumed to have 0 ~250 cc as shown in FIG. 1, the control current for the displacement angle (hereinafter referred to as displacement controlling current) of the pump/motor with a minimum of 0A and a maximum of 1A, ranges from 0.25 A to 0.95 A.

Therefore, even though the displacement controlling current of 0.5 A is supplied to the pump/motor, the capacity of the pump/motor actually does not have 125 cc which is ½ of the capacity, but instead has about 85 cc, so that a required capacity fails to exactly correspond to the actual capacity.

Figure 1:
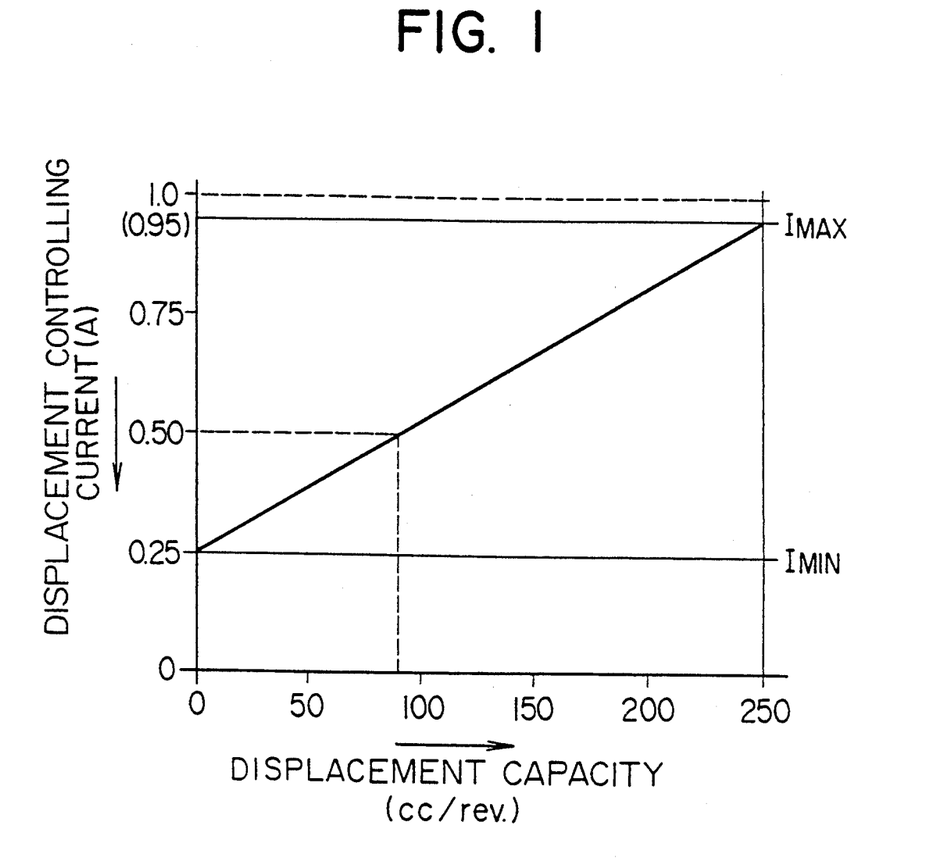
FIG. 1 is a graph illustrating the relationship between displacement controlling current and displacement capacity.

Furthermore, since such a characteristic as shown in FIG. 1 varies due to the electromagnetic hysteresis and electrical noise margin, a required capacity of the pump/motor cannot be settled.

SUMMARY OF THE INVENTION

It is accordingly an object of the present invention to provide a regenerative braking system for a car which can study the displacement capacity (angle) of a pump/motor used in a hydraulic oil circuit regardless of the variation of the characteristic of the pump/motor.

The principle of the present invention will be at first described herebelow.

Figure 2:
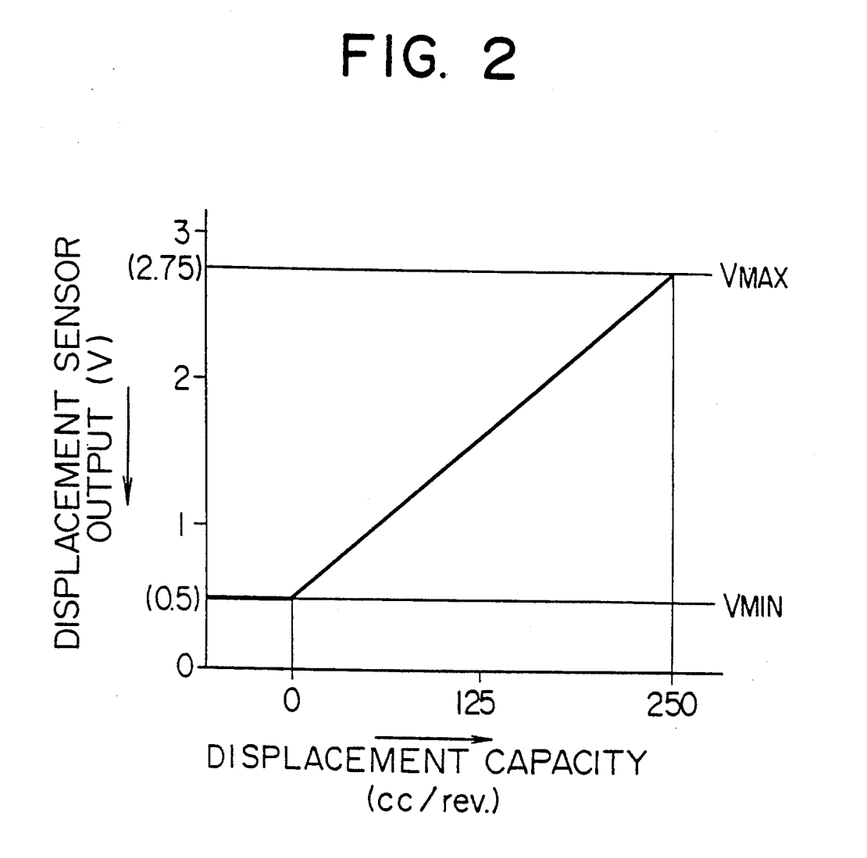
FIG. 2 is a graph illustrating the relationship between the output voltage of a displacement angle sensor and displacement capacity.

As shown in FIG. 1, the displacement capacity of the pump/motor is controlled over the range from 0 to 250 cc which corresponds to a displacement controlling current range of 0.25 ~0.95 A, while the output voltage of a sensor used for sensing the displacement capacity (hereinafter referred to as displacement sensor) ranges from 0.5 V ~ 2.75 V corresponding to the capacity of 0 ~ 250 cc, as shown in FIG. 2.

Therefore, the relationship between the displacement controlling current (A) and the output voltage (V) of the displacement sensor is such that the displacement controlling current $I_{min}$ (0.25 A) for minimizing the capacity of the pump/motor to zero corresponds to the output voltage $V_{min}$ (0.5 V) of the displacement sensor and that the displacement controlling current $I_{max}$ (0.95 A) for maximizing the capacity of the pump/motor to 250 cc corresponds to the output voltage $V_{max}$ (2.75 V) of the displacement sensor.

If the range of the displacement controlling current from 0.25 to 0.95 A is divided by the capacity of 250 cc to determine control current corresponding to a unit capacity, the study of the displacement capacity can be excluded.

Figure 3:
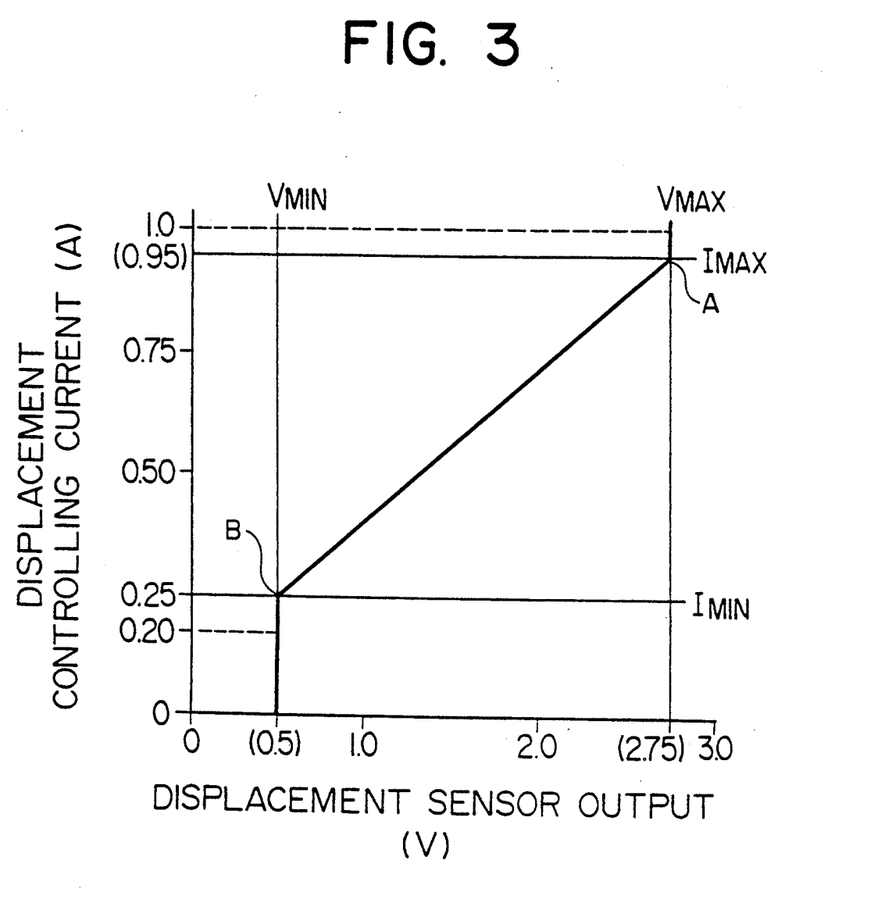
FIG. 3 is a graph illustrating the relationship between displacement controlling current and the output voltage of the displacement angle sensor.

As above described, however, it is possible that the maximum/minimum output voltage of the displacement sensor and therefore the corresponding displacement controlling current vary from the positions shown in FIG. 3 due to the electromagnetic hysteresis and the noise margin. Therefore, if the displacement capacity control without considering such a variation is carried out, it will be inaccurate.

This is why the study of the displacement capacity is required.

According to the present invention, control means provides the maximum permissible current and the minimum operating current for a displacement angle controlling electromagnetic proportional control valve when a hydraulic oil circuit including a pump/motor is not operated, i.e. when the pump/motor is not used. Then, the control means decreases stepwise the maximum permissible current and increases stepwise the minimum operating current.

As a result, a variation taking place at the output of the displacement sensor is detected as shown in FIG. 3 by points A and B to study each displacement controlling current respectively corresponding to the above noted maximum and minimum capacities of the pump/motor, whereby the displacement controlling current for the pump/motor is determined per a unit capacity from the difference between both values of the current.

Hereby, the displacement angle of the pump/motor is precisely made to correspond to the controlling current for the proportional control valve in the energy recovery/regenerative modes.

BRIEF DESCRIPTION OF THE DRAWINGS

The present invention will be more apparent to those skilled in the art, from the following drawings in which.

Throughout the figures, the same reference numerals indicate identical or corresponding portions.

DETAILED DESCRIPTION OF THE PREFERRED EMBODIMENTS

There will now be described the embodiments of a regenerative braking system for a car according to the present invention.

Figure 4:
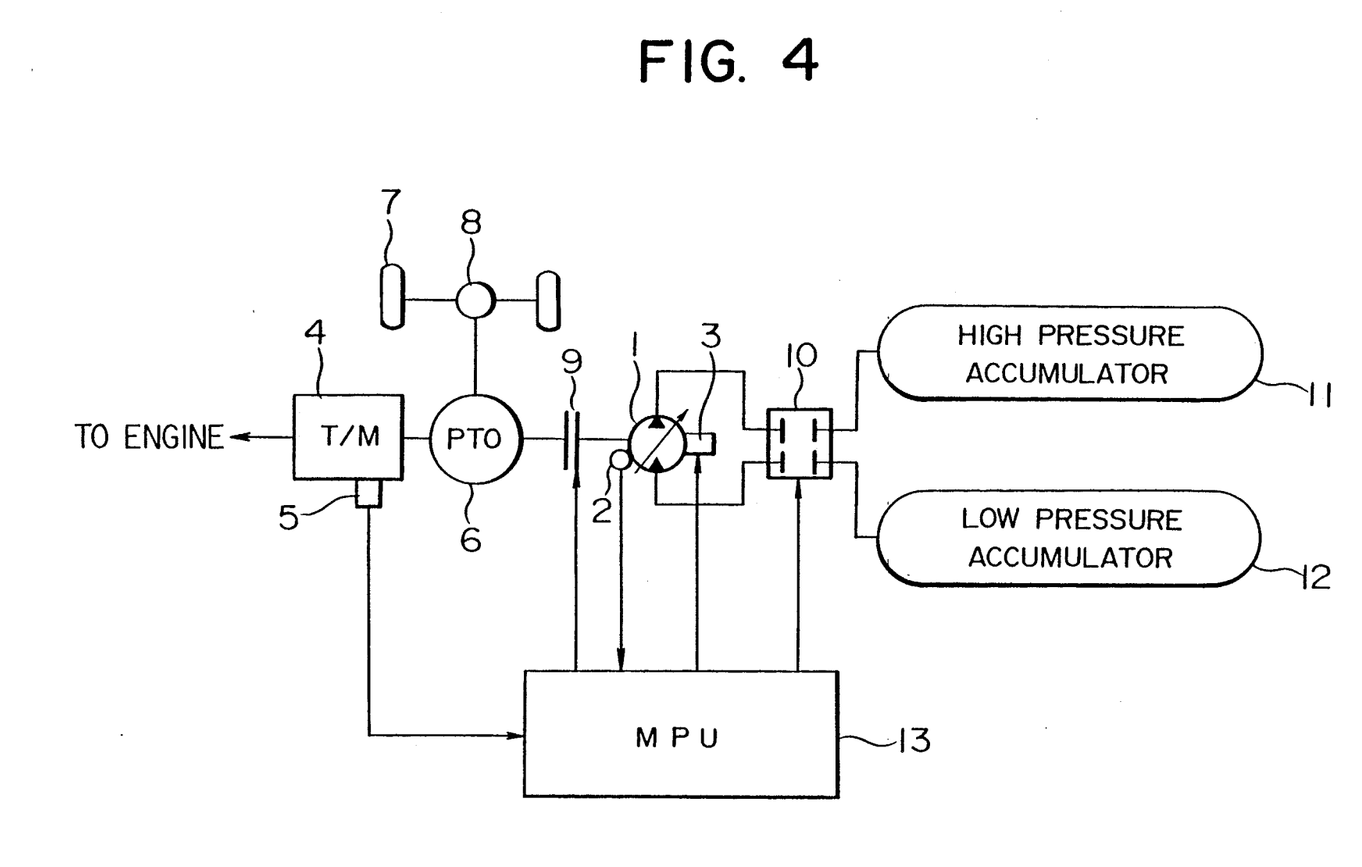
FIG. 4 is a schematic diagram of a regenerative braking system for a car with a pump/motor studying its displacement capacity in accordance with the present invention.

Referring now to FIG. 4, the arrangement of the regenerative braking system (hereinafter referred to as RBS) includes; a pump/motor 1; a displacement sensor 2 for sensing the displacement angle (incline angle) of the pump/motor 2; a displacement angle controlling proportional electromagnetic valve 3 for controlling the displacement angle of the pump/motor 1; a transmission (hereinafter abbreviated as T/M) 4; a gear position sensor 5 for sensing the gear position of the T/M; a PTO unit 6 for taking off the driving force of wheels 7 as hydraulic braking force through an axle 8 or conversely for transferring the hydraulic driving force to the wheels 7 through the axle 8; an electromagnetic clutch 9 for connecting or disconnecting the driving force between the PTO unit 6 and the pump/motor 1; a circuit shut-off valve 10; a high pressure accumulator 11; a low pressure accumulator 12 forming a hydraulic circuit together with the pump/motor 1, the circuit shut-off valve 10, and the high pressure accumulator 11; and a micro-processor (hereinafter abbreviated as MPU) as control means for displacement controlling current corresponding to the capacity of the pump/motor 1 when it finds from the output or states of the gear position sensor 5, the electromagnetic clutch 9, and the circuit shut-off valve 10 that the pump/motor 1 is not being used.

The operation of this embodiment shown in FIG. 4 will be described with reference to an interrupt routine, shown in FIGS. 5 to 7, for determining displacement controlling current corresponding to a unit capacity of the pump/motor 1, stored in and executed by the MPU 13 shown in FIG. 4.

Starting this routine, the MPU 13 checks from the gear position sensor 5 whether or not the gear position is one of neutral (N), reverse (R), and parking (P) (step T1 in FIG. 5), checks whether or not the electromagnetic clutch 9 is on (step T2), and checks whether or not the circuit shut-off valve 10 is on (step T3), whereby the MPU 13 checks whether or not the hydraulic circuit including the pump/motor 1 is operated.

In those steps, when the gear position is not any one of N, R, P, when the magnetic clutch 9 is on, or when the circuit shut-off valve 10 is on, the MPU 13 finds that the hydraulic circuit is enabled to operate. In this condition, it is meaningless and dangerous to study the displacement angle of the pump/motor 1 in this condition, so that the routine ends.

If it is found in any one of steps T1, T2, and T3 that the pump/motor 1 is being used, the MPU 13 gives to the proportional electromagnetic valve 3 the maximum permissible current (1A in FIG. 3) which necessarily gives the pump/motor 1 the maximum displacement angle, and stores it (step S1). Then, the output voltage $V_O$ of the displacement sensor 2 at the moment is stored in a memory $V_M$ (not shown) (step S2).

Next, for safety's sake, that is to make sure the hydraulic circuit is not in an operating state (since there is a delay from the time when the proportional valve 3 is given controlling current to the time when the displacement angle of the pump/motor 1 has the value corresponding to the controlling current), it is determined whether the hydraulic circuit is enabled to operate (like in steps T1~T3) in steps S3~S5.

As a result, if it is found that the hydraulic circuit is enabled to operate, the routine ends. If it is found that the hydraulic circuit is not in use, the displacement controlling current I is reduced by 2.5 mA (step S6), and it is determined whether the current output voltage $V_O$ of the displacement sensor 2 is equal to the voltage stored in the memory $V_M$, i.e. $V_M = V_O$ (step S7).

During the interval when $V_M = V_O$, steps S3~S7 are repeated to reduce the displacement controlling current I by 2.5 mA. When it is found that $V_M \neq V_O$ (point A in FIG. 3), it is assumed in step S8 that the current displacement controlling current I plus 2.5 mA is the actual maximum displacement controlling current $I_{MAX}$ (0.95 A in FIG. 3), while the voltage stored in the memory $V_M$ is set as the maximum output voltage $V_{MAX}$ of the displacement sensor 2 (step S9), and this routine ends.

Subsequently, the MPU 13 starts the program shown in FIG. 6 for the determination of the minimum displacement controlling current.

Figure 5:
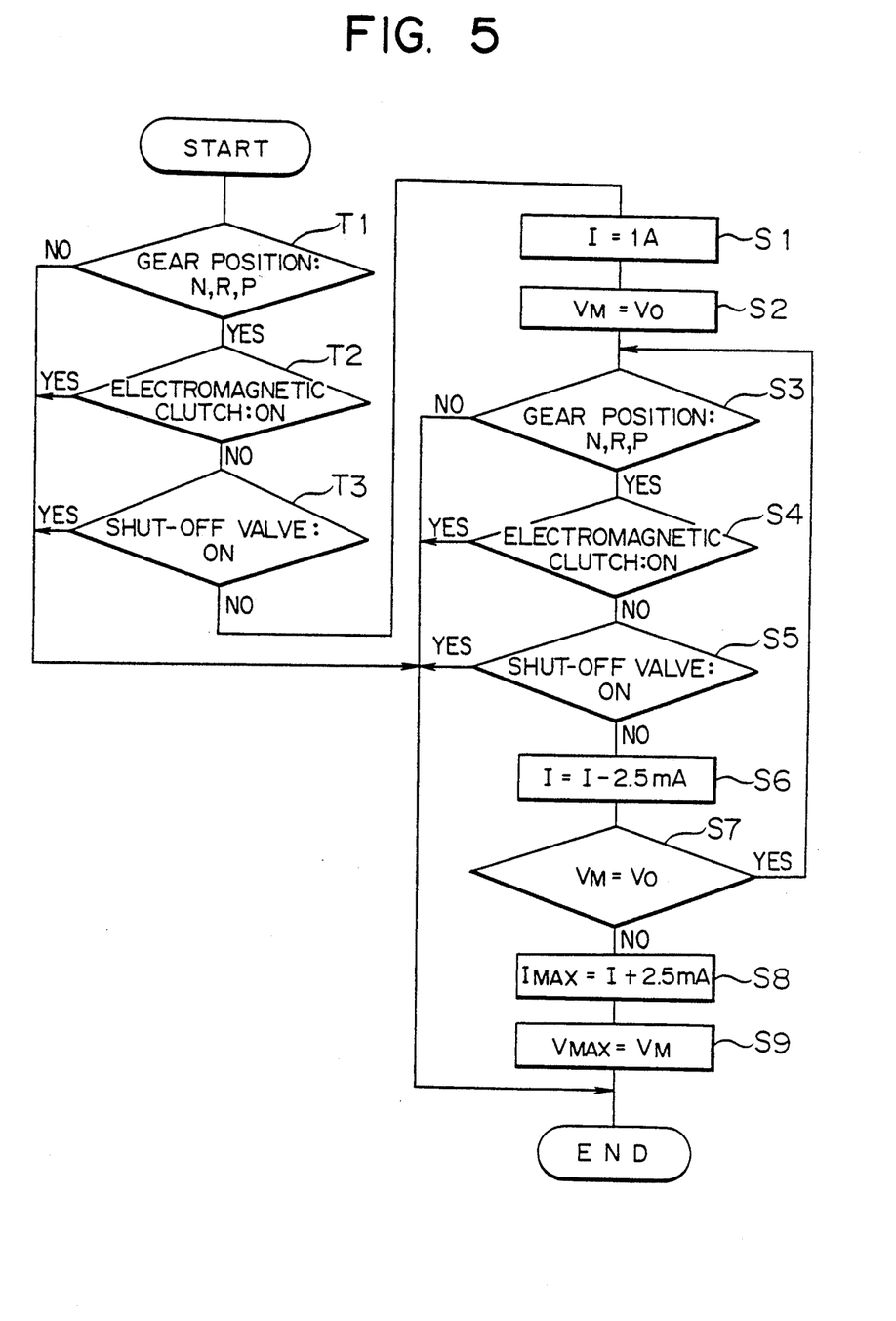
FIG. 5 is a flow chart for determining a maximum displacement controlling current according to the present invention.

As in the routine in FIG. 5 the MPU 13 determined whether or not the hydraulic circuit is operating (steps T11~T13). If the MPU 13 finds that the pump/motor 1 is not operating in any of steps T11~T13, the MPU 13 gives to the proportional electromagnetic valve 3 the minimum operating current (0.2 A in FIG. 3) which necessarily gives the pump/motor 1 the minimum displacement angle, and stores it (step S11). Then, the output voltage $V_O$ of the displacement sensor 2 at that moment is stored in the memory $V_M$ (step S12).

Next, for safety's sake, it is again determined whether or not the hydraulic circuit is enabled to operate (as in steps T11 ~T13) in steps S13~S15.

As a result, if it is found that the hydraulic circuit is enabled to operate, the routine ends, while if it is found that the hydraulic circuit is not in use, the displacement controlling current I is increased by 2.5 mA (step S16), and it is determined whether or not the current output voltage $V_O$ of the displacement sensor 2 is equal to the voltage stored in the memory $V_M$, i.e. $V_M = V_O$ (step S17).

During the interval when $V_M = V_O$, steps S13~S17 are repeated to increase the displacement controlling current I by 2.5 mA. When it is found that $V_M \neq V_O$ (point B in FIG. 3), it is assumed in step S18 that the current displacement controlling current I minus 2.5 mA is the actual minimum displacement controlling current $I_{MIN}$ (0.25A in FIG. 3), while the voltage stored in the memory $V_M$ is set as the minimum output voltage $V_{MIN}$ of the displacement sensor 2 (step S19), and this routine ends.

Figure 6:
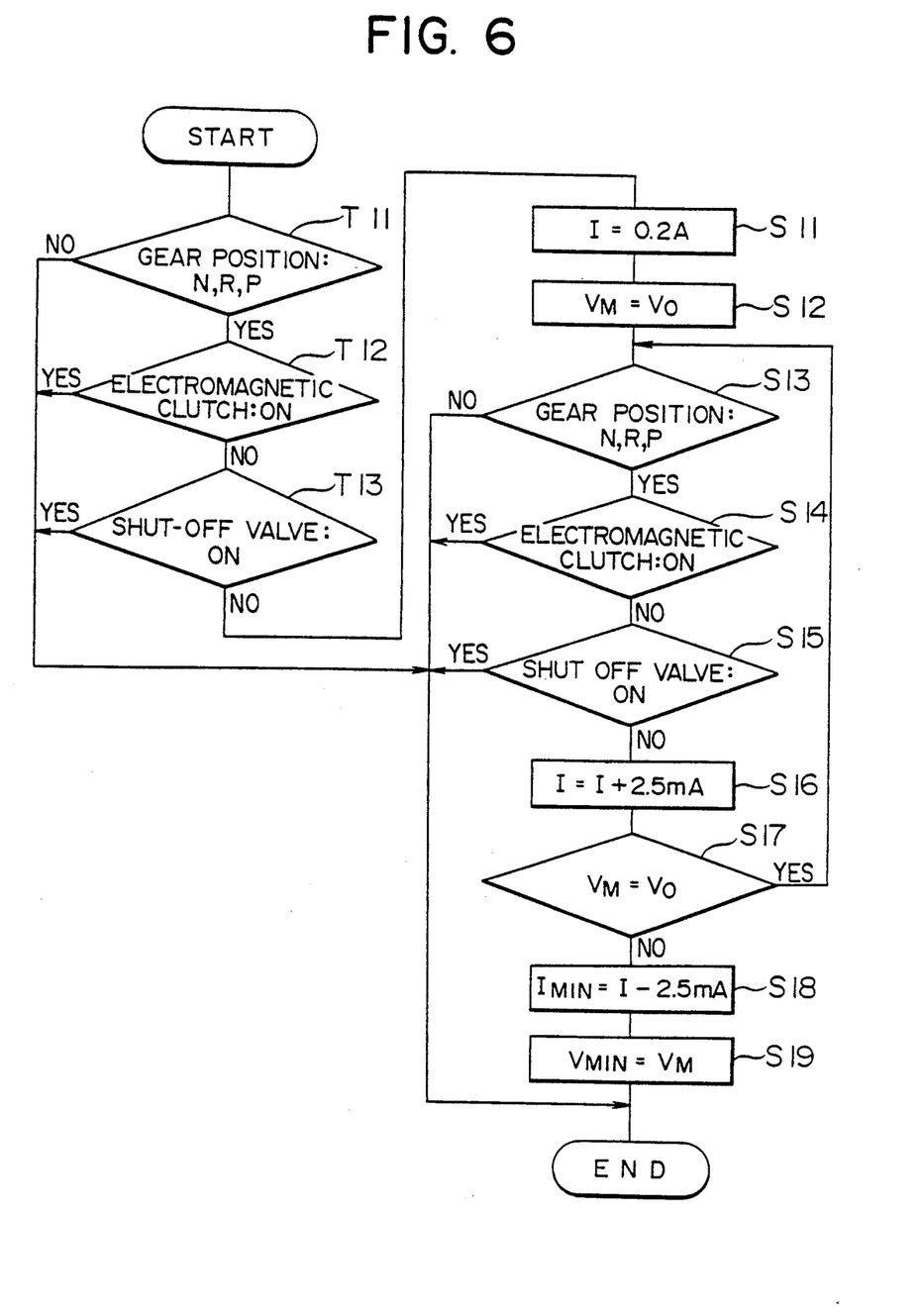
FIG. 6 is a flow chart for determining a minimum displacement controlling current according to the present invention.
Figure 7:
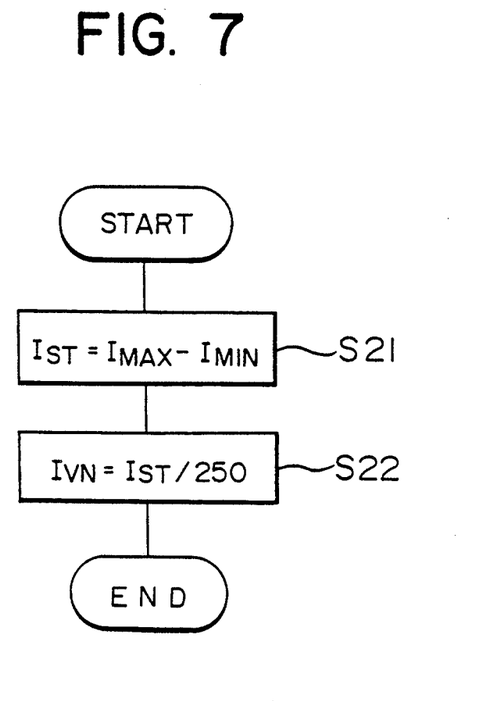
FIGS. 7 is a flow chart for determining displacement angle controlling current per unit capacity of the pump/motor according to the present invention.

To determine the actual maximum/minimum displacement controlling current from the above routines shown in FIGS. 5 and 6, the MPU 13 executes the program shown in FIG. 7.

At first, the dynamic range $I_{ST}$ of the displacement controlling current for controlling the unchangeable capacity 0~250 cc of the pump/motor 1 is determined by subtracting the minimum displacement controlling current $I_{MIN}$ from the maximum displacement controlling current $I_{MAX}$ in step S21 in FIG. 7. Then, the dynamic range $I_{ST}$ is divided by the maximum capacity 250 cc of the pump/motor 1 to determine the displacement controlling current $I_{VN}$ per unit capacity 1 cc in this example in step S22, whereby the program ends.

Consequently, the displacement controlling current $I_{VN}$ thus determined is used to determine the displacement controlling current, by 0.25A plus $I_{VN} \times$ the displacement capacity of the pump/motor 1 as required in the example shown in FIG. 1 for controlling the hydraulic circuit in the braking mode or accelerating mode.

We claim:

1. A regenerative braking system for a car comprising:
   a hydraulic circuit formed of:
     a high pressure accumulator;
     a pump/motor having a displacement angle;
     a circuit shut-off valve coupled to said pump/motor and said high pressure accumulator; and
     a low pressure accumulator coupled to said circuit shut-off valve;
   means for determining whether said hydraulic circuit is in operation;
   means for sensing the displacement angle of said pump/motor;
   a displacement angle controlling electromagnetic proportional control valve, coupled to said pump/motor, for controlling the displacement capacity of said pump/motor; and
   control means for providing said displacement angle controlling electromagnetic proportional control valve a maximum permissible current and a minimum operating current when said hydraulic circuit is not in operation, said control means studying a maximum and a minimum displacement controlling current of said pump/motor on the basis of a variation of the sensed displacement angle when the maximum permissible current and the minimum operating current are respectively decreased and increased in a stepwise manner, thereby determining a displacement controlling current per a unit capacity for said displacement angle controlling electromagnetic proportional control valve.

2. A regenerative braking system for a car according to claim 1, wherein the car includes a gear, an electromagnetic clutch and a power take off unit, wherein said means for determining whether said hydraulic circuit is in operation, includes means for sensing the position of the gear and the state of the electromagnetic clutch for connecting or disconnecting said pump/motor to or from the power take off unit, and wherein said control means determines that said hydraulic circuit is not in operation if the sensed gear position is any one of neutral, reverse, and parking, if the electromagnetic clutch is off, or if the circuit shut-off valve is off.

3. A regenerative braking system for a car according to claim 2, wherein said control means again checks whether or not said hydraulic circuit is in operation after the maximum permissible current and the minimum operating current have been provided to said displacement angle controlling electromagnetic proportional control valve.

4. A regenerative braking system for a car according to claim 1, wherein said control means determines the displacement controlling current per unit capacity by subtracting the minimum displacement controlling current from the maximum displacement controlling current and by dividing the difference by a maximum capacity of said pump/motor.

5. A regenerative braking system for a vehicle, comprising:
- a hydraulic circuit including a pump/motor having a displacement angle;
- means for determining whether said hydraulic circuit is in operation;
- means for sensing the displacement angle of said pump/motor;
- a control valve, coupled to said pump/motor, for controlling the displacement capacity of said pump/motor; and
- means for providing said control valve a first current level and a second current level when said hydraulic circuit is not in operation, said control means determining first and second displacement controlling currents of said pump/motor on the basis of a variation of the sensed displacement angle when the first current level and the second current level are respectively decreased and increased in an incremental manner, so that a displacement controlling current per unit capacity is determined for said control valve.

6. A regenerative braking system as set forth in claim 5, wherein the first current level and the second current level are respectively decreased and increased in a stepwise manner.

7. A regenerative braking system as set forth in claim 6, wherein said control valve is an electromagnetic proportional control valve.

8. A regenerative braking system as set forth in claim 5, wherein said control valve is an electromagnetic proportional control valve.

* * * * *